Figure 1:
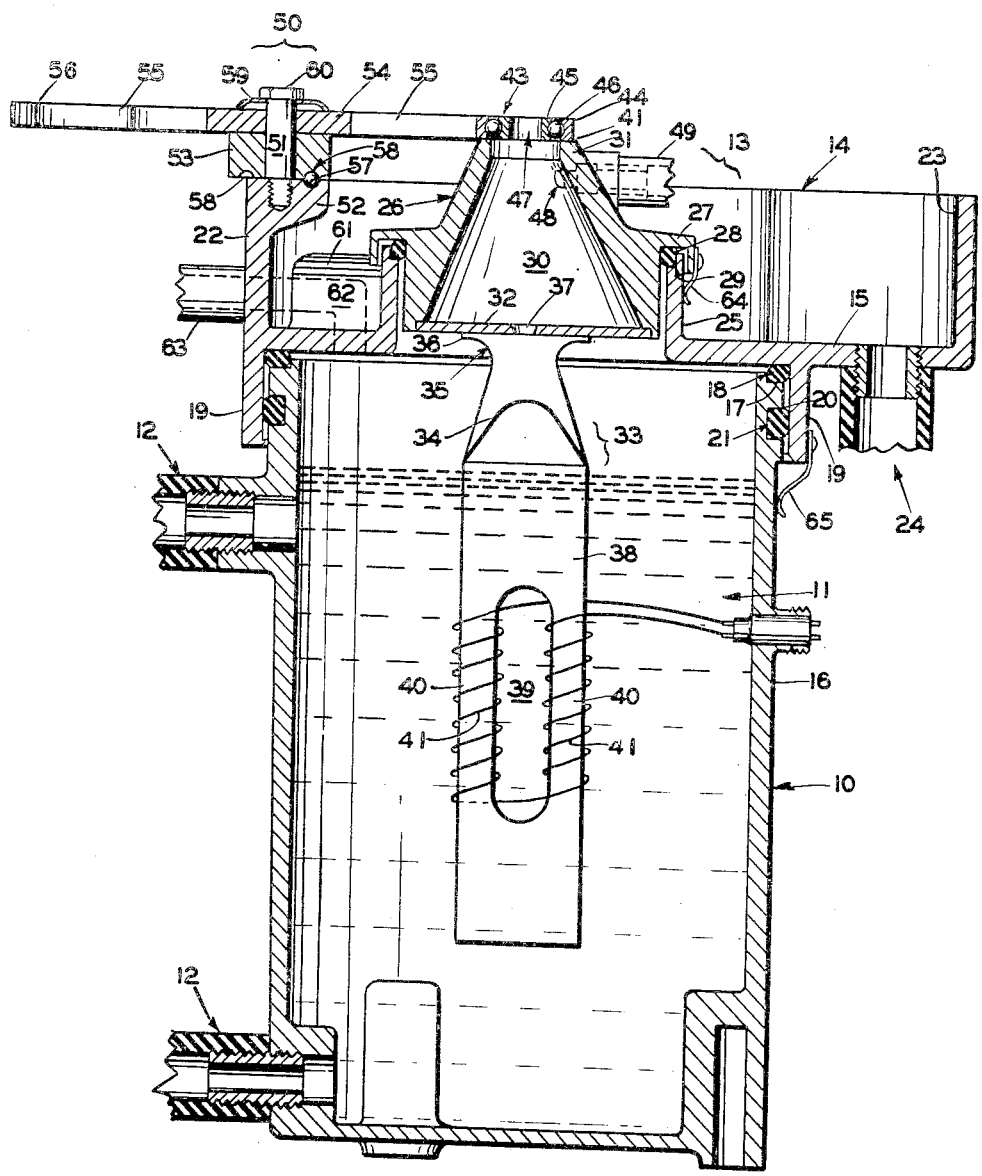

Jan. 29, 1957  G. G. BROWN  2,779,695
BALL BEARING ASSEMBLY CLEANER
Filed Nov. 15, 1954  2 Sheets-Sheet 2

INVENTOR.
GILBERT G. BROWN
BY
ATTORNEY

United States Patent Office 2,779,695
Patented Jan. 29, 1957

2,779,695

BALL BEARING ASSEMBLY CLEANER

Gilbert G. Brown, Davenport, Iowa, assignor to Bendix Aviation Corporation, Teterboro, N. J., a corporation of Delaware Application November 15, 1954, Serial No. 468,781

16 Claims. (Cl. 134—1)

This invention relates to cleaning apparatus and methods, and more particularly to apparatus and methods for cleaning articles, especially assembled ball bearings, by means of the combined action of fluid and ultrasonic vibrations.

It is particularly useful in cleaning ball bearing assemblies used in delicate instruments in which low torque bearings, those offering extremely slight resistance to rotation or oscillation, are of prime importance, and where any increase in such resistance is serious and sometimes fatal to the utility of the instrument. Ball bearing assemblies for use in this field are subjected to intensive and elaborate cleaning operations, both to remove all particles of dirt, even the most minute, and to eliminate from the surfaces of balls, races, separators and shields all traces of substances that might cause even the slightest rusting or other corrosion, or might interfere with the wetting of all parts of the surface by lubricating and protective oil.

Cleaning difficulties are enhanced when the ball bearing components have been subjected to lapping, a step generally required when the bearings are to be used in delicate instruments, since particles of the very fine lapping material are held quite firmly by the metal surfaces, and their adequate removal generally requires a multi-step and lengthy series of operations, including tumbling, treatment with detergents, removal of detergents, and other steps.

Present cleaning methods generally fail to reach adequately the hidden recesses in ball bearing assemblies, since even flushing with liquid detergent applies only to exposed surfaces the force necessary to remove dirt particles. These particles are frequently extremely fine, and may be retained by the metal surfaces, especially when the assembly has been treated with a lapping compound. Bearings supposed to be clean are generally shipped and stored in vials filled with expensive oil, which must be thrown out when the bearings are removed because it may contain dirt particles that have worked out of hidden recesses. According to a common procedure, each bearing is first placed on a spindle and sprayed with solvent under high pressure during manual rotation to enable the solvent to reach all surfaces, and then torque tested. If it does not pass, and it generally does not, the process is repeated. After three failures it is subjected to recleaning in liquids in several stages, including tumbling, and again hand cleaned and torque tested. Expeirence has shown that even after passing the tests a bearing may fail after incorporation in an instrument when a dirt particle is finally dislodged during use.

These operations are time-consuming, some of the materials used are costly, and the overall expense is high. Moreover, when manual rotation is used, dislodged particles of metal or grinding material may be forced between the balls and races under sufficient pressure to cause brinelling or dents that disqualify the bearing for delicate instruments. Even ordinary ultrasonic cleaning may not be fully effective, as particles dislodged by such cleaning may remain trapped in the interstices of the bearing assemblies.

While the invention is especially advantageous when used for cleaning ball bearing assemblies, it includes features which are likewise applicable to other cleaning operations employing a fluid cleaning medium, in which the combined effect of the fluid and the simultaneous application of ultrasonic waves is unexpectedly advantageous. Moreover, it is applicable to other articles having a rotating part or parts which may be rotated at the same time that dirt is dislodged by the kinetic action of a cleaning liquid.

An object of the invention is to provide means and methods for removing dirt from an article by dislodging the dirt through the simultaneous kinetic action of flowing cleaning fluid and the action of ultrasonic waves. A further object is to provide means and methods for cleaning an article having a rotating part by rotating said part through the kinetic action of flowing cleaning fluid, and also by the action of ultrasonic waves.

An object of the invention is to provide an apparatus and method for cleaning ball bearing assemblies that will be substantially free from the objections set forth. A feature of the invention is the provision of an arrangement in which a race is mechanically rotated during cleaning, so as to expose all surfaces to the action of the cleaning fluid.

A purpose is to provide an arrangement of this type in which a race is rotated by the cleaning fluid. This arrangement is advantageous, both because it dispenses with race impelling mechanism, and because it is gentle in action, permitting the race to stop when obstructed by a dirt particle, so that the surface will not be defaced. Another object is to provide an automatic indication of the presence of a dirt particle in the assembled bearing and to permit its ready removal without damage. The indication is provided when the rotating race halts, and the particle may be removed by manipulation of the assembly, such as slight reverse rotation to free the particle for removal by the flowing fluid.

A purpose of the invention is to provide a convenient and efficient method and arrangement for rotating the assembly by cleaning fluid drive. This results is obtained in general by providing a flow of cleaning liquid impinging on the assembly in a direction having a tangential component. In the preferred form this is accomplished by creating a vortex in a liquid supply chamber, and flowing the rotating liquid from the vortex directly through the ball bearing assembly. A feature of this arrangement is the provision of off center or tangential liquid feed to the supply chamber to create the vortex, and the location of the ball bearing assembly at an end of the chamber through which the liquid flows, preferably in the top, in a position axially aligned with the vortex.

A further object is to facilitate the rotation of a race by the rotating liquid through the use of ultrasonic waves. It was found that when the ball bearing assembly is ultrasonically vibrated, the race on which the liquid impinges will be rotated much more readily, by liquid moving more slowly, than is possible without the use of ultrasonic waves.

Another important object is to provide improved utilization of ultrasonic waves to assist in the cleaning of ball bearing assemblies. A purpose is to provide a novel cooperation between the loosening of dirt particles and coatings by ultrasonic action, and the removal of such particles by flowing fluid. An object is to provide apparatus for flowing cleaning fluid through a ball bearing assembly that is arranged for efficient simultaneous transmission of ultrasonic waves to said assembly.

A further purpose is to provide a novel arrangement which will transmit ultrasonic waves to the ball bearing assembly during fluid cleaning. Another object is to transmit ultrasonic waves through fluent cleaning liquid in the cleaning zone, thereby enhancing the effectiveness of the liquid. An ancillary object is to provide an arrangement in which both the ball bearing assembly and cleaning liquid flowing through the assembly are simultaneously subjected to the action of ultrasonic waves.

Another object is to provide cleaning apparatus of the indicated type in which a vortex-forming liquid supply unit is provided with means for transmitting ultrasonic waves through the liquid, through the unit walls or through both to a ball bearing assembly during cleaning.

An additional object is to provide a novel arrangement for successively locating ball bearing assemblies in cleaning position.

Another object is to provide an efficient arrangement for continuously feeding and removing cleaning liquid. A further purpose is to provide an improved mounting for a magnetostrictive transducer, and in particular one that will concentrate the wave energy in the cleaning zone, with reduced loss of energy to inactive portions of the structure. Ancillary objects are to provide an enclosure for the transducer having cooling means, and to sectionalize the structure with wave-damping elements between sections, arranged for convenient manufacture, assembly, operation and replacement.

The foregoing and other objects, purposes and advantages of the invention will appear more fully hereafter from consideration of the detailed description which follows, in conjunction with the accompanying drawings wherein one embodiment of the invention is illustrated. It is to be expressly understood, however, that the drawings are for the purposes of illustration and description and are not to be construed as defining the limits of the invention.

Figure 2:
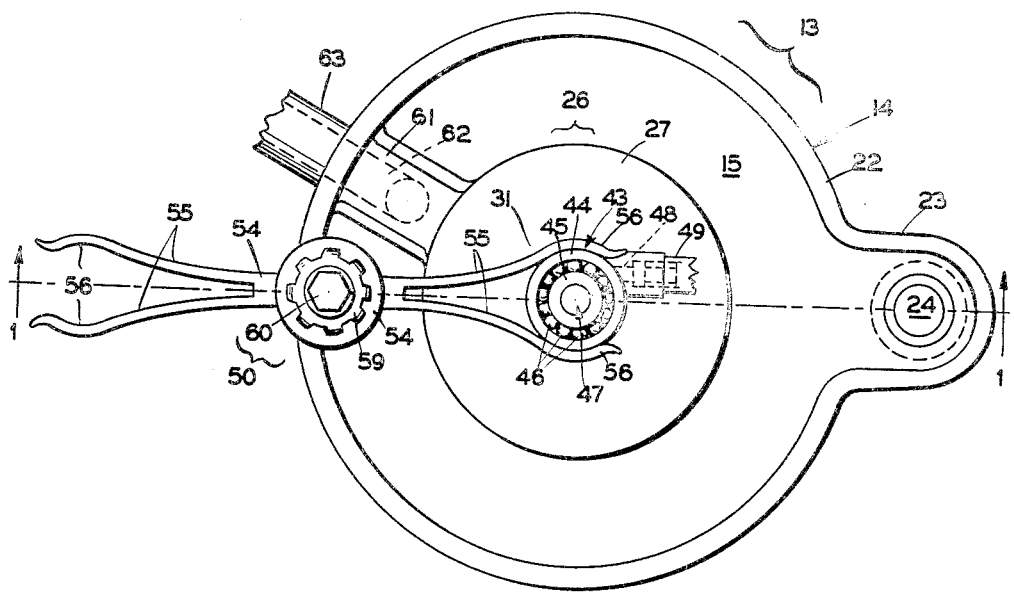

In the drawings:

Fig. 1 is a vertical central section on line 1—1 of Fig. 2 through an embodiment of the invention; and Fig. 2 is a plan view of said embodiment.

The illustrated embodiment is provided with a base in the form of a container 10 adapted to hold transducer cooling liquid 11 and preferably provided with a liquid recirculating arrangement, including liquid supply and discharge connections 12. A cleaning unit indicated generally at 13 is mounted on base 10, advantageously through connections that permit ready removal and damp the transmission of ultrasonic waves. In the form illustrated, cleaning unit 13 includes a trough section 14 having a bottom 15 supported on the side wall 16 of base 10 by an O-ring 17 of suitable elastomeric material fitting into a positioning recess 18 in the upper end of wall 16. A flange 19 on bottom 15 extends downwardly adjacent to wall 16; and a second O-ring 20 of similar material may be located in recess 21 in side wall 16 and bear against flange 19 to maintain the latter out of contact with wall 16.

The trough section 14 is provided with side wall 22, which may be aligned with flange 19, and in the form shown includes a lateral extension 23 projecting beyond flange 19 and provided with a bottom outlet 24 for cleaning liquid effluent. Trough section 14 also has an inner wall 25 at the inner margin of bottom 15.

The cleaning unit 13 also includes a cleaning section 26 mounted on inner wall 25 and provided with a chamber for cleaning liquid, a seat for ball bearing assemblies at the outlet from the chamber, a source of ultrasonic waves and a liquid supply arranged to create a vortex in the chamber. The cleaning section is supported on inner wall 25 through a wave-damping medium, the form illustrated including an apron 27 extending across the top of said wall and downwardly around it for a short distance, resting on a resilient O-ring 28 seated in a recess 29 in the inner side of the wall top, arranged to keep the cleaning section 26 entirely out of direct contact with wall 25.

In the illustrated embodiment section 26 is provided with a frusto-conical chamber 30 having a tapered side wall 31 and a bottom 32. In the preferred form the latter consists of a flat plate silver brazed or otherwise rigidly attached to side wall 31. A magnetostrictive transducer unit 33 is firmly attached to chamber bottom 32 and is freely suspended thereby within the base container 10. The preferred embodiment of this unit, which in general is of the type described in co-pending application Serial No. 405,756, Brown, filed January 25, 1954, includes generally a wave transmitting metal block 34 having a circular section 35 of reduced area and a circular lip portion 36 immediately about the section 35, attached firmly to chamber bottom 32 as by silver brazing, being advantageously centered by a stud 37 fitting a central aperture in said bottom 32.

The laminated magnetostrictive transducer stack 38 is firmly attached to the registering rectangular base of block 34, as by silver brazing, and advantageously is of the type described in said application, including a central longitudinal slot 39 forming side bars 40 carrying windings 41 diagrammatically shown and connected to a suitable source of D. C. voltage and of A. C. energy of appropriate frequency, not shown.

The upper end of side wall 31 terminates in an annular seat 42 for a ball bearing assembly 43, which includes an outer race 44, an inner race 45 and balls 46. Seat 42 is arranged to engage and underlie only the outer race 44, having a liquid discharge aperture 47 in register with the inner race 45 and balls 46. An inlet to the chamber 30 for cleaning liquid is provided, and is arranged to inject the liquid along a line offset from the vertical axis of said chamber in such manner as to create a vortex in the chamber, so that the liquid flowing through outlet 47 will have a rotary movement. It has been found that this is effectively produced by locating the inlet in the upper part of a chamber 30; and in the form illustrated a horizontal inlet passage 48 extends through side wall 31 into the chamber 30, the axis of passage 48 being preferably at right angles to and horizontally offset from the vertical axis of chamber 30. Passage 48 is connected to a suitable supply pipe 49 for cleaning liquid.

An arrangement for locating the ball bearing assemblies 43 accurately on seat 42, and for rapidly removing and replacing them, may be provided, and advantageously is mounted on the cleaner structure. In the form illustrated, a ball bearing assembly feed unit 50 is mounted on the margin of trough section 14, and includes a pivot stud 51 threaded into a boss 52 on the side wall 22. A rotor block 53 is journaled on stud 51 and carries a cross arm 54 having symmetrical sections projecting at opposite sides of block 53. Each section includes opposed spring arms 55 provided with registering concave clamping ends 56, arranged to receive and hold firmly in place a ball bearing assembly 43. Arm 54 is arranged so that the inner section will locate an assembly 43 accurately on seat 42; and the unit 50 includes an indexing arrangement for yieldably holding clamping ends 56 of arm 54 in accurately registered position over said seat. As shown, this includes a detent ball 57 seated in boss 52 and extending into a shallow annular channel in the block 53 provided with indexing recesses 58 at opposite sides. Block 53 is yieldably biased against the boss 52 and ball 57, as by spring washer 59 bearing against the top of block 53 and the head 60 of stud 51.

A convenient arrangement for supplying cooling liquid 11 to the interior of base container 10 may be provided in the trough section 14, the form illustrated including a transverse boss 61 provided with a passage 62 extending downwardly through bottom 15 into communication with said container and outwardly through side wall 22, where it may be connected to feed pipe 63.

It has been found desirable to ground all parts of the apparatus to prevent the accumulation of static charges. As the container 10 is grounded through the electrical system, this is readily accomplished by spring strap 64 on cleaning section 26 in contact with trough section 14, and spring strap 65 on section 14 in contact with container 10.

In operation, base container 10 is filled with cooling liquid 11, which is recirculated through connections 12 at a rate sufficient to maintain stack 38 at the proper temperature. Cleaning liquid is fed through supply pipe 49 to chamber 30, where it creates a vortex and overflows with appropriate rotary motion through outlet 47 and over side wall 31 and apron 27 into the trough section 23, from which it is discharged through outlet 24. A ball bearing assembly 43 is placed between the clamping ends 56 of the outer section of arm 54, which is then rotated until the assembly is in register with seat 42, where it will be accurately indexed by ball 57 and recess 58.

The cleaning liquid will flow upwardly around the inner race 45 and around balls 46 through the space between races 45 and 44, its rotary motion imparting rotation to the inner race 45 in the absence of obstructing dirt, so that the liquid will reach all parts of the interior recesses of the assembly. Simultaneously the transducer unit 33 is energized and transmits ultrasonic waves through the liquid in chamber 30 to the portion of the liquid passing through the assembly 43, and also through side walls 31 of the cleaning section 26 to said assembly, so that both the assembly and the liquid passing through it are subjected to ultrasonic waves.

In this operation all surfaces of the assembly are reached by both the liquid and the ultrasonic waves. The liquid reaches even the lower face of the outer race 44 which rests on seat 42, since it has been found that under the influence of the ultrasonic waves the liquid will force itself between the outer race 44 and seat 42, cleaning the lower race face.

If a particle of dirt dislodged by this operation should locate in a portion of the ball bearing assembly 43 where it will obstruct rotation of the inner race 45, such rotation will be halted with a minimum of pressure on the obstructing particle so that no deformation of the surfaces contacted by said particle will result. The presence of the particle will be immediately signaled to the operator by the halting of race rotation, and the particle can be readily freed by rotating the race slightly in reverse direction, so that the cleaning liquid can remove the particle. After sufficient time has elapsed for removal of all dirt particles and of all coating material, during which time the operator has placed another ball bearing assembly 43 in the outer gripper 56, arm 54 is manually rotated to bring the new assembly into position on seat 42, while the cleaned assembly may be removed from its clamping elements 56 and subjected to suitable drying and oiling operations, either before or after such removal.

The cleaning liquid may be of any suitable type, detergent liquids for this purpose being known to those skilled in the art. Oil base solvents are preferred, since they not only serve to remove dirt and lapping compounds from the boundaries of the metal, but also leave a surface coating on the metal which aids in preventing rust and facilitates the wetting of the metal surfaces with the oil that must be subsequently applied. An oil base solvent such as "Varsol," a trademark of the Stoddard Company, has been found to be suitable, such solvent generally being a petroleum fraction which starts to distill at about 300° F., is 50% distilled at about 350° F. and its end point is about 400° F. It is used as a cleaning fluid, is clear and sweet smelling, and is described in Specification P–S–661 issued by the U. S. Department of Commerce, General Services Administration. It is known as a Stoddard solvent, described in Commercial Specification CF3–40 of the U. S. Department of Commerce.

After a bearing assembly 43 is cleaned in the manner indicated, it is dried to remove the cleaning fluid except for the thin film already mentioned, and then is oiled with a suitable oil, which will protect all surfaces of the assembly against rust during shipment and storage. Oils suitable for this purpose are well known to the art and may be applied in atomized form. It has been found that the efficiency with which all surfaces are reliably covered by such oil is improved by the ultrasonic cleaning operations above set forth. This makes it possible to dispense with the current system of shipping such bearings immersed in expensive oil, thereby reducing substantially the cost of the bearing assembly.

It should be clearly understood that there is a difference in kind, not degree, between cleaning liquid which flows past an article at a rate merely sufficient to carry off particles dislodged by chemical or solvent action, or by the effect of ultrasonic waves, and the action of cleaning liquid which impinges on the surface of the article at a velocity sufficient to assist in dislodging particles from the article. In the latter case the kinetic energy of the liquid is a factor in cleaning; in the former case it is not, the flow of the liquid being effective only to remove dislodged particles and spent liquid and to provide continuously fresh cleaning liquid to the article surfaces. In the present instance, while the rate of flow may be varied, its velocity in the region of impact on the bearing assembly or other article in cleaning position may be sufficiently great so that its kinetic energy will be a factor, not only in rotating the inner race and balls, but also in the mechanical removal of dirt particles from the surface of the article.

The apparatus and method disclosed herein have been described as utilizing ultrasonic waves or vibrations; and waves in the range of 16 to 24 kilocycles per second have been found effective in practice, unexpectedly good results having been obtained at a frequency of 18 kilocycles per second. However, cleaning action may be obtained in the manner indicated herein at frequencies above and below those set forth, including audible frequencies; and the term "ultrasonic" as used herein shall be understood as including such effective frequencies, except where otherwise indicated.

For convenience the invention has been described as applicable to ball bearings; but this term is used herein to include other bearings of the same type, such as roller bearings; and references to balls are intended to include equivalents such as rollers.

References herein to vortical flow are intended to indicate fluid flow in which the fluid has both rotary and longitudinal movement relative to a flow axis. References herein to ultrasonic wave transmitting material designate materials having an acoustic impedance in the general range of such impedances of the usual metals from which apparatus and parts thereof are made, such that ultrasonic waves of cleaning intensity can be transmitted through the material from one point to another at a substantial distance.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

I claim:

1. Article cleaning apparatus, comprising a passage for flowing cleaning liquid, means for supporting an article to be cleaned in position extending across the passage in the flow path of an unbroken flowing body of liquid, means for imparting rotary movement to the flowing liquid body around a supported article and means for imparting ultrasonic waves to said body of liquid contacting said article.

2. Article cleaning apparatus, comprising a passage for flowing cleaning liquid, means for supporting an article to be cleaned in position extending across the passage in the liquid flow path, including an element engaging the article, means for imparting rotary movement to the flowing liquid around a supported article, means for imparting ultrasonic waves to the liquid contacting said article, and means for imparting ultrasonic waves to said engaging element and thereby to a supported article.

3. Article cleaning apparatus, comprising a passage for flowing cleaning liquid having a wall, means for supporting an article to be cleaned in contact with the wall and extending across the passageway in the liquid flow path, and means for imparting ultrasonic waves to said wall and thereby transmitting such waves through the wall to the article and also through the liquid to the portion of the liquid contacting said article.

4. Article cleaning apparatus for articles containing ultrasonic wave transmitting material, comprising a passage for flowing cleaning liquid, means for supporting an article to be cleaned in position extending across the passageway in the liquid flow path, and means for imparting ultrasonic waves directly to and through said material in a supported article from a source other than said liquid during liquid flow along the article.

5. Article cleaning apparatus, comprising a wall defining a chamber for flowing cleaning liquid having a liquid overflow outlet at the top, an article seat carried by the wall and extending around the outlet, and means for imparting ultrasonic waves to said seat and thereby to an article on said seat during passage of cleaning liquid along the article.

6. Article cleaning apparatus, comprising a wall defining a chamber for flowing cleaning liquid having a liquid overflow outlet at the top, an article seat on the wall extending around the outlet, and means for imparting ultrasonic waves to the wall and thereby to the liquid flowing along an article on the seat and also to said seat and article.

7. Article cleaning apparatus, comprising a chamber for flowing cleaning liquid having a liquid overflow outlet at the top, said chamber having a side wall and a bottom, an article seat on the side wall extending around the outlet, and means for imparting ultrasonic waves to the chamber bottom and thereby through the side wall to said seat and an article thereon and also through liquid in the chamber to the liquid in contact with such article.

8. Cleaning apparatus for a ball bearing assembly having two races, comprising a passage for flowing cleaning fluid, means for supporting an assembly in the passage transversely to the fluid flow with a race free to rotate, and means for imparting rotary motion to an unbroken transversely continuous body of fluid in the passage flowing against said assembly and thereby rotating said free race by fluid pressure during cleaning.

9. Article cleaning apparatus comprising a chamber having a wall structure provided with an inlet and a top overflow outlet for cleaning liquid, an article support in contact with the wall structure, arranged to support an article in the liquid, an ultrasonic wave generator connected to and supported by the wall structure, arranged to transmit ultrasonic vibrations through said structure and support to an article to be cleaned, an overflow receiving unit surrounding said chamber, and a vibration-damping supporting connection between said wall structure and unit.

10. Article cleaning apparatus comprising a chamber for flowing cleaning liquid having a top outlet, and an article feed device comprising a supply member rotatably mounted about a vertical axis, including an article gripping member movable into and out of register with said outlet.

11. Ball bearing assembly cleaning apparatus comprising a cleaning unit including a chamber for flowing cleaning liquid having a top overflow outlet, a seat extending around the outlet, and an assembly feed unit, including a member rotatably mounted on said cleaning unit and including an arm and an assembly gripping device movable into and out of register with said outlet with the outer portion of an assembly in said gripping device engaging said seat.

12. An article cleaning method for articles containing ultrasonic wave transmitting material which comprises removing dirt from such an article by the kinetic action of a flowing fluid and the simultaneous action of ultrasonic waves transmitted through said material in the article from a source other than said liquid to a surface of the article.

13. An article cleaning method for articles containing ultrasonic wave transmitting material which comprises removing dirt from such an article by the kinetic action of flowing fluid and the simultaneous action of ultrasonic waves transmitted both through said material in the article from a source other than said liquid to a surface of the article and through the liquid directly to a surface of the article.

14. A method of cleaning an article having a rotatable element, which comprises providing a vortical movement in a flowing body of cleaning liquid, and removing dirt from the article and simultaneously rotating said element by kinetic action of the cleaning liquid, by locating said article in said body of liquid in axial alignment with said vortical movement.

15. A method of cleaning an article having a rotatable element, which comprises removing dirt from the article and rotating said element by the kinetic action of flowing cleaning liquid, and simultaneously subjecting the surface of said article to the action of ultrasonic waves traveling through said liquid to the article.

16. The method of cleaning a ball bearing assembly having inner and outer races and intermediate balls, which comprises creating a vortical movement in a flowing body of cleaning liquid, and removing dirt from the article while rotating one race by kinetic action of the cleaning liquid by immersing the assembly in said body of liquid in axial alignment with the vortical movement.

References Cited in the file of this patent

UNITED STATES PATENTS

| | | |
|---|---|---|
| 2,369,498 | Strueber | Feb. 13, 1945 |
| 2,468,550 | Fruth | Apr. 26, 1949 |
| 2,495,295 | Spanier | Jan. 24, 1950 |
| 2,616,820 | Bourgeaux | Nov. 4, 1952 |
| 2,654,378 | Beaudry | Oct. 6, 1953 |
| 2,694,307 | Henry | Nov. 16, 1954 |

FOREIGN PATENTS

| | | |
|---|---|---|
| 648,609 | Great Britain | Jan. 10, 1951 |